US009346899B2

(12) United States Patent
Backer et al.

(10) Patent No.: US 9,346,899 B2
(45) Date of Patent: *May 24, 2016

(54) POLYMERS HAVING CHELATING FUNCTIONALITY

(71) Applicants: Dow Global Technologies LLC, Midland, MI (US); Rohm and Haas Company, Philadelphia, PA (US)

(72) Inventors: Scott Backer, Philadelphia, PA (US); Allen Bulick, Lansdale, PA (US); Joseph Manna, Quakertown, PA (US); Cynthia Rand, Sanford, MI (US); Jia Xie, Lake Jackson, TX (US)

(73) Assignees: Rohm and Haas Company; Dow Global Technologies LLC

( * ) Notice: Subject to any disclaimer, the term of this patent is extended or adjusted under 35 U.S.C. 154(b) by 0 days.

This patent is subject to a terminal disclaimer.

(21) Appl. No.: 14/354,618

(22) PCT Filed: Oct. 31, 2012

(86) PCT No.: PCT/US2012/062681
§ 371 (c)(1),
(2) Date: Apr. 28, 2014

(87) PCT Pub. No.: WO2013/066934
PCT Pub. Date: May 10, 2013

(65) Prior Publication Data
US 2014/0303337 A1  Oct. 9, 2014

Related U.S. Application Data

(60) Provisional application No. 61/553,642, filed on Oct. 31, 2011.

(51) Int. Cl.
| | | |
|---|---|---|
| *C08F 20/64* | (2006.01) | |
| *C02F 5/12* | (2006.01) | |
| *C08F 16/28* | (2006.01) | |
| *C08F 216/14* | (2006.01) | |
| *C08F 220/36* | (2006.01) | |
| *C11D 3/37* | (2006.01) | |
| *C08F 212/14* | (2006.01) | |
| *C08F 12/22* | (2006.01) | |
| *C08F 12/28* | (2006.01) | |

(52) U.S. Cl.
CPC . *C08F 20/64* (2013.01); *C02F 5/12* (2013.01); *C08F 16/28* (2013.01); *C08F 216/1458* (2013.01); *C08F 220/36* (2013.01); *C11D 3/3769* (2013.01); *C08F 12/22* (2013.01); *C08F 12/28* (2013.01); *C08F 212/14* (2013.01)

(58) Field of Classification Search
CPC ............ C02F 5/12; C08F 16/28; C08F 20/64; C08F 216/1458; C08F 220/36; C08F 12/22; C08F 12/28; C08F 212/14; C11D 3/3769
USPC ................................................. 526/286, 312
See application file for complete search history.

(56) References Cited

U.S. PATENT DOCUMENTS

| | | | |
|---|---|---|---|
| 2,840,603 A | 6/1958 | Mock et al. | |
| 2,910,445 A | 10/1959 | Mock et al. | |
| 2,921,809 A | 1/1960 | Kogstrom | |
| 3,090,771 A | 5/1963 | D Alelio | |
| 3,214,413 A * | 10/1965 | D Alelio | C07D 207/16 260/DIG. 31 |
| 3,285,886 A | 11/1966 | Gunderson et al. | |
| 3,331,773 A | 7/1967 | Gundreson et al. | |
| 3,591,405 A | 7/1971 | McCarty | |
| 4,348,848 A | 9/1982 | Denzer | |
| 4,386,006 A | 5/1983 | Harrington | |
| 4,560,492 A | 12/1985 | Curry et al. | |
| 4,659,481 A | 4/1987 | Chen | |
| 4,906,383 A | 3/1990 | Chen et al. | |
| 4,913,880 A | 4/1990 | Chen et al. | |
| 4,931,188 A | 6/1990 | Chen | |
| 5,514,732 A | 5/1996 | Vanderlaan et al. | |
| 5,548,049 A | 8/1996 | Brehm et al. | |
| 5,580,941 A | 12/1996 | Krause et al. | |
| 6,060,040 A | 5/2000 | Tournier et al. | |
| 6,869,537 B1 * | 3/2005 | Nambu et al. | 210/683 |
| 6,875,508 B1 * | 4/2005 | Nambu et al. | 428/375 |
| 7,971,119 B2 | 6/2011 | Hsu | |
| 2008/0026219 A1 | 1/2008 | Tsushima et al. | |
| 2008/0082242 A1 | 4/2008 | Dell'Eva et al. | |
| 2008/0262192 A1 | 10/2008 | Yoneda | |
| 2009/0008224 A1 | 1/2009 | DeGroot | |
| 2011/0120936 A1 | 5/2011 | Escobar et al. | |
| 2011/0183880 A1 | 7/2011 | Yoneda et al. | |

FOREIGN PATENT DOCUMENTS

| | | |
|---|---|---|
| CH | 313159 A | 3/1956 |
| DE | 19732664 A1 | 2/1998 |
| GB | 1215116 A | 12/1970 |
| GB | 1310613 A | 3/1973 |
| JP | 05-287690 | 11/1993 |
| JP | 05-302288 A | 11/1993 |
| JP | 05-311194 A | 11/1993 |
| JP | 2007248863 A | 9/2007 |
| JP | 2009102526 | 5/2009 |
| WO | 9808585 A1 | 3/1998 |

OTHER PUBLICATIONS

XP002690459, Database Registry, Chemical Abstracts Service, 2012.
XP002690460, Database Registry, Chemical Abstracts Service, 2012.

\* cited by examiner

Primary Examiner — Ling Choi
Assistant Examiner — Chun-Cheng Wang

(57) ABSTRACT

The present invention provides novel polymers having chelating functionality and comprising units derived from an ethylenically unsaturated aminocarboxylate monomer which comprises units derived from ethylenediamine triacetic acid or its salt and a polymerizable vinyl monomer. The polymerizable vinyl monomer may be selected from (0-, m-, p-)DVBMO, allyl glycidyl ether, and glycidyl (meth)acrylate. The polymer may also comprise units derived from one or more ethylenically unsaturated monomers.

9 Claims, No Drawings

POLYMERS HAVING CHELATING FUNCTIONALITY

CROSS REFERENCE TO RELATED APPLICATIONS

This application is a 35 §371 national phase filing of PCT/US2012/062681 filed Oct. 31, 2012, which claims the benefit of U.S. Application No. 61/553,642, filed Oct. 31, 2011.

FIELD OF THE INVENTION

The present invention relates to novel polymers having chelating functionality and comprising units derived from an ethylenically unsaturated aminocarboxylate monomer. The ethylenically unsaturated aminocarboxylate monomer comprised units derived from ethylenediamine triacetic acid or its salt and units derived from an ethylenically unsaturated monomer, such as a polymerizable vinyl monomer.

BACKGROUND OF THE INVENTION

Synthetic detergents typically consist of a dispersant, a builder, and other miscellaneous ingredients such as brighteners, perfumes, anti-redepositon agents and enzymes. The dispersant typically comprises a surfactant and functions to separate dirt, soil and stains from fabric and other substrates. Polyacrylates are well known and commonly used dispersant compounds. The builder binds with and forms a complex with metal cations, such as calcium and magnesium ions found in "hard water," which otherwise interfere with the dispersant activity. Such binding and complex formation is also commonly referred to as "chelating" and compounds capable of such interaction with metal ions are known as "chelating agents."

Phosphates are excellent chelating agents, which is why they were historically used as builders for detergents. However, large amounts of phosphorus were released to streams, rivers, lakes and estuaries, even after wastewater treatment. In natural water bodies, phosphorous acts as a fertilizer, increasing growth of algae and aquatic weeds, which depletes oxygen available for healthy fish and aquatic life whose numbers then decreased. Consequently, most jurisdictions have limited or banned the use of phosphates in detergents.

In the search for phosphate substitutes, amino carboxylate compounds have been found to be effective chelating agents and, therefore, useful as builders for laundry and automatic dishwashing detergents. For example, U.S. Pat. No. 3,331,773, teaches preparation of water soluble polymers having chelating functionality by grafting water soluble chelating monomers onto water soluble polymers. Diethylenetriamine, ethylenediamine tetraacetic acid, and other polyalkylene polyamine polyacetic acids are identified as examples of chelating monomers suitable for grafting onto water soluble polymers.

U.S. Pat. No. 5,514,732 also describes contact lenses made from water insoluble polymers having chelating functionality. The polymers are made from aminopolycarboxylic acids with a polymerizable olefinic group, as well as a hydrophilic monomer and one or more crosslinking monomer.

U.S Patent Application No. 2008/00262192 describes an water-soluble polymer having a high chelating performance and clay dispersancy which is made by polymerizing an amino group-containing allyl monomer derived from adding an amine compound, such as iminodiacetic acid (IDA), to an allyl monomer, such as allyl glycidal ether (AGE). Also according to U.S Patent Application No. 2008/00262192, the amino group-containing allyl monomer may be polymerized with other polymerizable monomers including, without limitation, unsaturated monocarboxylic acid monomers.

U.S Patent Application No. 2009/0082242 discloses a phosphate free dish washing liquor comprising exfoliated nanoclay, a clay-dispersing polymer, as well as other components including known chelating agents such as nitrilotriacetates (NTA), ethylene diamine acetate (EDTA), propylene diamine tetraacetic acid, (PDTA), ethylene diamine N,N'-disuccinic acid (EDDS) and methyl glycine di-acetic acid (MGDA), or their salts.

The present invention provides novel polymerizable monomer compounds which are water soluble and have chelating functionality, as well as polymers made therefrom which shall be useful in aqueous systems for scale inhibition, soil removal, tea destaining, particulate dispersion and metal ion binding.

SUMMARY OF THE INVENTION

The present invention is a novel polymer having chelating functionality and comprising units derived from an ethylenically unsaturated aminocarboxylate monomer having the following general structure:

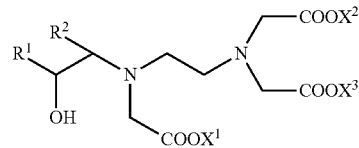

wherein $X^1$, $X^2$ and $X^3$ are each, independently, hydrogen or a mono- or polyvalent cation and the total charge on the monomer is zero; and one, and only one, of $R^1$ and $R^2$ is an H group, and the other is a polymerizable arm comprising a vinyl group and derived from one or more ethylenically unsaturated monomers. The one or more ethylenically unsaturated monomers may comprise a polymerizable vinyl monomer.

In some embodiments, the polymerizable arm of the ethylenically unsaturated aminocarboxylate monomer may be derived from a divinylbenzene mono epoxide (DVBMO) monomer and have the following structure:

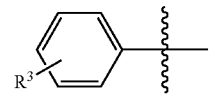

Wherein $R^3$ is a polymerizable ethylenically unsaturated group located at the ortho-, para-, or meta-substituted position of the benzene ring. For example, $R^3$ may be —CH=CH$_2$.

In some embodiments, the polymerizable arm of the ethylenically unsaturated aminocarboxylate monomer may be derived from an allyl glycidyl ether monomer and have the following structure:

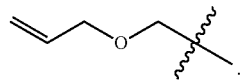

In some embodiments, the polymerizable arm of the ethylenically unsaturated aminocarboxylate monomer may be derived from a glycidyl (meth)acrylate monomer and have the following structure:

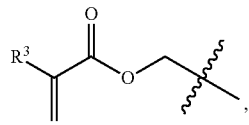

wherein $R^3$ is hydrogen or —$CH_3$.

The polymer may be a homopolymer comprising only units derived from the aforesaid an ethylenically unsaturated aminocarboxylate monomer. Alternatively, the polymer may additionally comprise units derived from one or more ethylenically unsaturated monomers.

Additionally, the polymer may comprise 0.5-99.5%, by weight, of the ethylenically unsaturated aminocarboxylate monomer, and 99.5-0.5%, by weight, of the one or more ethylenically unsaturated monomers, based on the total weight of the polymer.

DETAILED DESCRIPTION OF THE INVENTION

All percentages stated herein are weight percentages (wt %), unless otherwise indicated.

Temperatures are in degrees Celsius (° C.), and ambient temperature means between 20 and 25° C., unless specified otherwise.

Weight percentages of monomers are based on the total weight of monomers in the polymerization mixture from which the subject polymer is produced.

The term "polymerized units derived from" as used herein refers to polymer molecules that are synthesized according to polymerization techniques wherein a product polymer contains "polymerized units derived from" the constituent monomers which are the starting materials for the polymerization reactions.

"Polymer" means a polymeric compound or "resin" prepared by polymerizing monomers, whether of the same or different types. The generic term "polymer," as used herein, includes the terms "homopolymer," and "copolymer." For example, homopolymers are polymeric compounds understood to have been prepared from a single type of monomer. Copolymers, as this term is used herein, means polymeric compounds prepared from at least two different types of monomers. For example, an acrylic acid polymer comprising polymerized units derived only from acrylic acid monomer is a homopolymer, while a polymer comprising polymerized units derived from acrylic acid, methacrylic acid and butyl acrylate is a copolymer.

"Polymerizable" as used to described a monomer or other molecule means that the monomer or other molecule has at least one carbon-carbon double bond and, therefore, is capable of forming additional covalent bonds with other monomers or molecules of its kind, other polymerizable monomers or molecules, or polymers having polymerizable pendant groups, under normal polymerization conditions, and become incorporated in to the product polymer.

"Ethylenically unsaturated monomers" means molecules having one or more carbon-carbon double bonds, which renders them polymerizable. Monoethylenically unsaturated monomers have one carbon-carbon double bond, while multiethylenically unsaturated monomers have two or more carbon-carbon double bonds.

As used herein, ethylenically unsaturated monomers include, without limitation, carboxylic acids, esters of carboxylic acids, carboxylic acid anhydrides, imides, amides, styrenes, sulfonic acids, and combinations thereof. Carboxylic acid monomers include, for example, acrylic acid, methacrylic acid, and salts and mixtures thereof. Sulfonic acid monomers include, for example, 2-(meth)acrylamido-2-methylpropanesulfonic acid, 4-styrenesulfonic acid, vinylsulfonic acid, 2-sulfoethyl(meth)acrylic acid, 2-sulfopropyl (meth)acrylic acid, 3-sulfopropyl(meth)acrylic acid, and 4-sulfobutyl(meth)acrylic acid and salts thereof. Further examples of ethylenically unsaturated monomers include, without limitation, itaconic acid, maleic acid, maleic anhydride, crotonic acid, vinyl acetic acid, acryloxypropionic acid, methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butyl acrylamide, N-methyl acrylamide, N,N-dimethyl acrylamide; acrylonitrile, methacryionitrile, allyl alcohol, allyl sulfonic acid, allyl phosphonic acid, vinylphosphonic acid, dimethylaminoethyl acrylate, dimethylaminoethyl methacrylate, phosphoethyl methacrylate, phosphonoethyl methacrylate (PEM), and sulfonoethyl methacrylate (SEM), N-vinyl pyrollidone, N-vinylformamide, N-vinylimidazole, ethylene glycol diacrylate, trimethylotpropane triacrylate, diallyl phthalate, vinyl acetate, styrene, divinyl benzene, allyl acrylate, 2-acrylamido-2-methyl propane sulfonic acid (AMPS) and its salts or combinations thereof.

As used herein, the term "(meth)acrylic" includes acrylic acid and methacrylic acid. As used herein, the term "(meth) acrylates" includes esters of acrylic acid and esters of methacrylic acid.

The present invention relates to new monomer compositions which are polymerizable monomers having chelating functionality and are referred to hereinafter as "ethylenically unsaturated aminocarboxylate monomers." The ethylenically unsaturated aminocarboxylate monomers of the present invention have the following general Structure I:

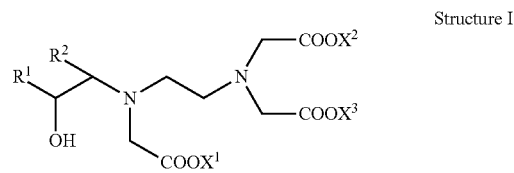

Structure I wherein $X^1$, $X^2$ and $X^3$ are each, independently, hydrogen or a mono- or polyvalent cation and the total charge on the monomer is zero; and one, and only one, of $R^1$ and $R^2$ is an H group, and the other is a polymerizable arm comprising a vinyl group and having one of the following structures:

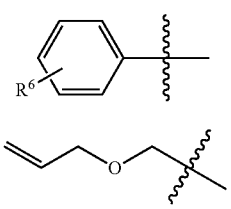

Structure B

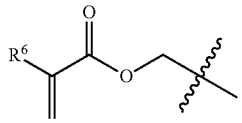

wherein R⁶ of Structure A is a polymerizable ethylenically unsaturated group located at the ortho-, para-, or meta-substituted position of the benzene ring. For example, R⁶ may be —CH=CH₂. Hereinafter, abbreviations for the possible structures of DVBMO in the ortho, para, and meta positions are o-DVBMO, p-DVBMO, and m-DVBMO. Note that "(o-, p-, m-)DVBMO" means one or more of the o-DVBMO, p-DVBMO, and m-DVBMO;

wherein R⁶ of Structure C is hydrogen or —CH₃.

In some embodiments, for example, $X^1$, $X^2$ and $X^3$ of Structure I may each, independently, be at least one cation selected from the group consisting of: $Na^+$, $K^+$, $NH_4^+$, organic ammonium ions, $Ca^{2+}$ and $Mg^{2+}$.

In some embodiments, each of Structures A, B and C are derived from one or more polymerizable vinyl monomers. Structure A may, for example, be derived from a DVBMO monomer, such as o-DVBMO, p-DVBMO, and m-DVBMO, or mixtures thereof. (o-, p-, m-)DVBMO has the general structure shown below:

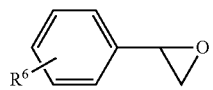

wherein R⁶ is a polymerizable vinyl (—HC=CH₂) group located at the ortho-, para-, or meta-substituted position of the benzene ring.

Structure B may, for example, be derived from an allyl glycidyl ether (AGE) monomer of the following structure:

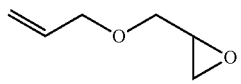

Structure C may, for example, be derived from a glycidyl (meth)acrylate (GA or GMA) monomer of the following structure:

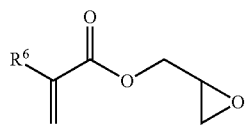

wherein R⁶ is hydrogen or —CH₃.

The ethylenediamine triacetic acid (ED3A) may, for example, be prepared according to the following reaction equation:

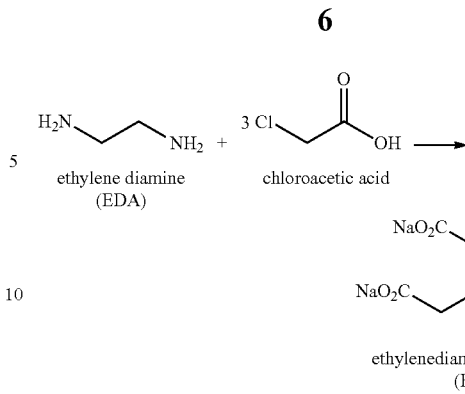

The foregoing reaction may be accomplished by reacting ethylene diamine in water, in the presence of sodium hydroxide, with chloroacetic acid at reaction temperatures of 50-70° C. and a pH of 9-10. The total amount of chloroacetic acid to be reacted is added to the ethylene diamine-in-water gradually and continuously over time, such as, over about an hour. The pH of the reaction mixture is maintained at 9-10 by addition of aqueous sodium hydroxide. More specifically, the foregoing reaction will produce a mixed product containing ethylenediamine diacetic acid (ED2A), ethylenediamine triacetic acid (ED3A), and ethylenediamine tetra-acetic acid (EDTA) having the following structures, in approximately the molar proportions indicated:

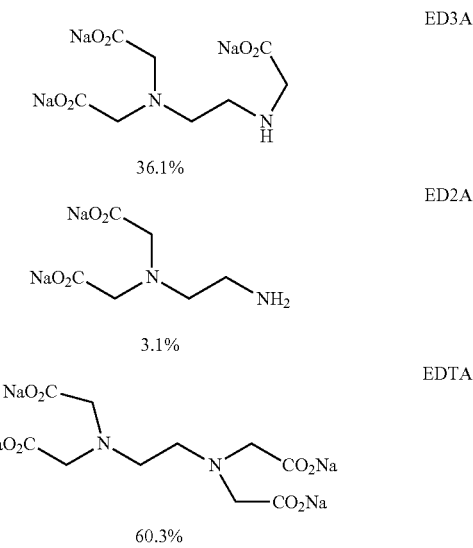

When EDA is reacted with chloroacetic acid at a molar ratio of EDA:chloroacteic acid of 1:2, the product mixture will contain a mixture having molar proportions closer to the following:

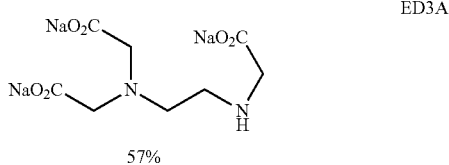

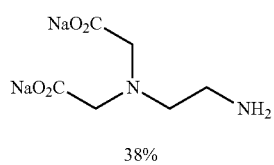

ED2A

38%

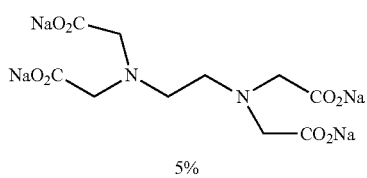

EDTA

5%

It will be noted that the foregoing mixture contains significantly less of the EDTA compound and more of the preferred ED3A and ED2A compounds. As understood by persons of ordinary skill in the relevant art, the EDA-chlororoacteic acid reaction may be further optimized between stoichiometries of 1:2 and 1:3 to maximize the proportion of ED3A contained in the product mixture.

The present invention also provides a process for making the ethylenically unsaturated aminocarboxylate monomers which comprises reacting ethylenediamine triacetic acid (ED3A), or its salt, with an ethylenically unsaturated monomer. This reaction may occur in the presence of a phase transfer catalyst such as, without limitation, benzyltrimethylammonium chloride, tetra-n-butylammonium bromide, methyltrioctylammonium chloride, hexadecyltributylphosphonium bromide, dimethyldiphenylphosphonium iodide, and methyltriphenoxyphosphonium iodide.

In some embodiments, the ethylenically unsaturated monomer is a polymerizable vinyl monomer selected from the group consisting of: (o-, p-, m-)DVBMO, allyl glycidyl ether (AGE) and glycidyl (meth)acrylate.

The ED3A and vinyl monomer may be reacted in any suitable ratio, as is readily determinable by persons of ordinary skill. The process for making the ethylenically unsaturated aminocarboxylate in accordance with the present invention may be conducted at ambient temperatures.

For example, the particular reaction scheme for the reaction of ED3A with GMA is as follows:

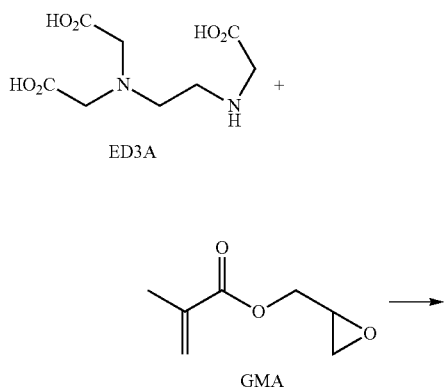

ED3A

GMA

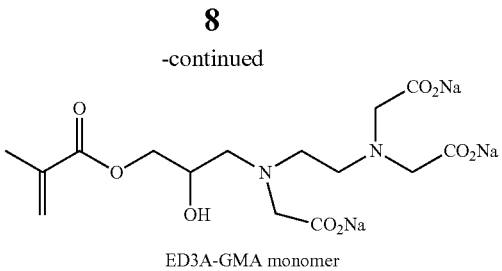

ED3A-GMA monomer

The foregoing reaction produces a mixture of ED3A-GMA monomers having the following structures:

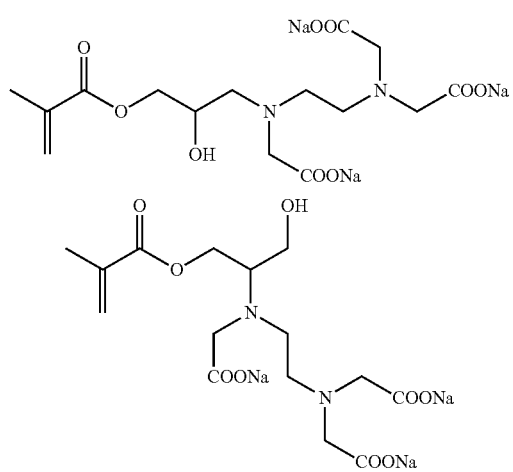

As noted above, the process for producing ED3A will typically produce a mixture of ED3A, ED2A and EDTA. When such a mixture is reacted with the vinyl monomer, the ED2A will also react with the vinyl monomer. For example, when a mixture of ED3A, ED2A and EDTA is reacted with GMA, the product will be a mixture of ethylenically unsaturated aminocarboxylate monomers including those shown above as well as the following structures:

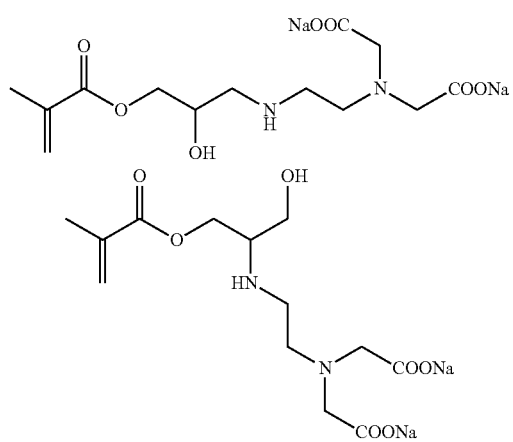

The ED2A-GMA products may be further reacted, with addition chloroacetic acid, to form additional ED3A-GMA monomers in the product mixture, according to the following reaction schemes:

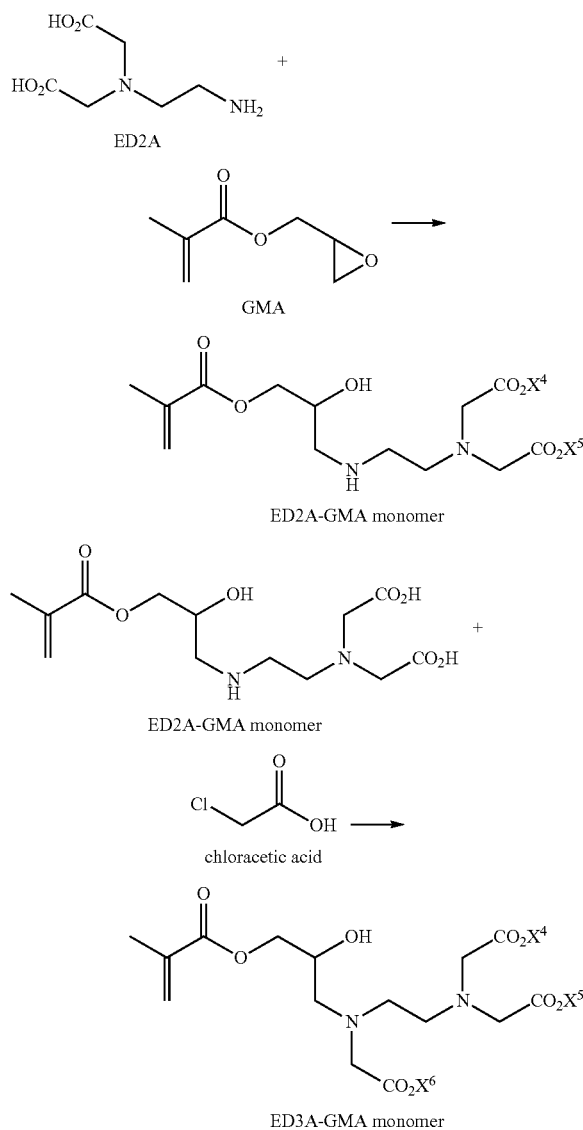

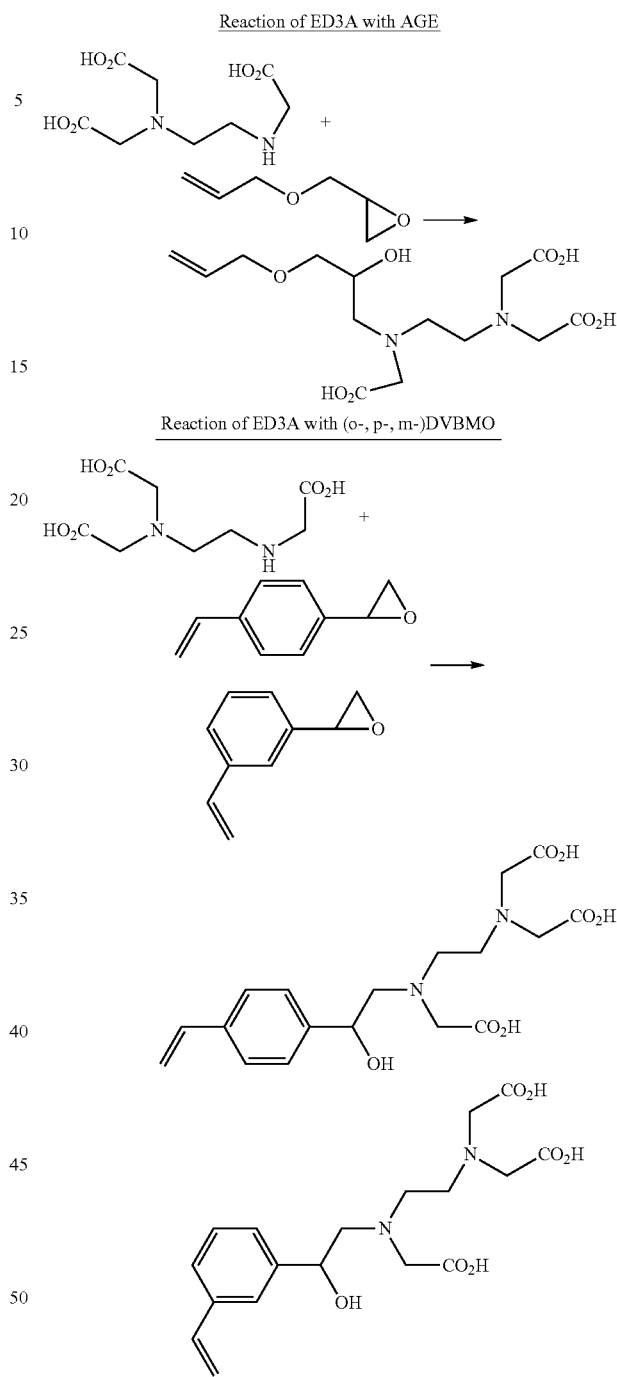

$X^4$, $X^5$ and $X^6$ in the structures above may be at least one cation selected from the group consisting of: $Na^+$, $K^+$, $NH_4^+$, organic ammonium ions, $Ca^{2+}$ and $Mg^{2+}$.

Thus, upon reacting the mixed product of the EDA-chloroacetic acid reaction with GMA, a mixture of ethylenically unsaturated aminocarboxylate monomers will result which contains all four of the above shown structures of ED2A-GMA and ED3A-GMA. As already mentioned, if desired, further reaction with additional quantities of chloroacetic acid will convert the ED2A-GMA monomer to more of the ED3A-GMA monomer.

As will be readily recognized by persons of ordinary skill in the relevant art, other vinyl monomers, such as AGE or (o-, p-, m-)DVBMO, may be substituted for GMA in the above-described reactions to produce ED3A-AGE or ED3A-(o-, p-, m-)DVBMO monomers according to the present invention. In either case, obviously, persons of ordinary skill will expect that the product will contain the structures shown below, as well as their isomers.

The present invention also provides a polymer having chelating functionality which comprises units derived from the vinyl aminocarboxlate monomer and, optionally, units derived from one or more ethylenically unsaturated monomers.

For example, the one or more ethylenically unsaturated monomers may be selected from the group consisting of (meth)acrylics, styrenics and maleic acid and anhydrides.

In some embodiments, the polymer according to the present invention is a homopolymer comprising 100%, by weight, of the ethylenically unsaturated aminocarboxylate monomer.

In other embodiments, the polymer according to the present invention may comprise at least 0.5%, by weight, of the ethylenically unsaturated aminocarboxylate monomer, for example, at least 5% by weight, or at least 20% by weight, or at least 30% by weight, or even at least 40% or 50%, by weight, of the ethylenically unsaturated aminocarboxylate monomer, based on the total weight of the polymer.

Furthermore, the polymer according to the present invention may comprise up to 99.5%, by weight, of the ethylenically unsaturated aminocarboxylate monomer, for example, up to 95% by weight, or up to 90% by weight, or up to 80% by weight, or even up to 75% or 60%, by weight of the ethylenically unsaturated aminocarboxylate monomer, based on the total weight of the polymer.

Furthermore, the polymer according to the present invention may comprise at least 0.5%, by weight, of the one or more ethylenically unsaturated monomers, for example, at least 5% by weight, or at least 20% by weight, or at least 30% by weight, or even at least 40% or 50%, by weight, of the one or more ethylenically unsaturated monomers, based on the total weight of the polymer. Furthermore, the polymer according to the present invention may comprise up to 99.5%, by weight, of the one or more ethylenically unsaturated monomers, for example, up to 95% by weight, or up to 90% by weight, or up to 80% by weight, or even up to 75% or 60%, by weight of the one or more ethylenically unsaturated monomers, based on the total weight of the polymer.

The method of polymerization is not particularly limited and may be any method known, now or in the future, to persons of ordinary skill including, but not limited to, emulsion, solution, addition and free-radical polymerization techniques.

For example, in some embodiments, the polymer having chelating functionality in accordance with the present invention may be produced using one or more free-radical polymerization reactions. Among such embodiments, some involve the use of one or more initiators. An initiator is a molecule or mixture of molecules that, under certain conditions, produces at least one free radical capable of initiating a free-radical polymerization reaction. Photoinitiators, thermal initiators, and "redox" initiators, among others, are suitable for use in connection with the present invention. Selection of particular initiators will depend on the particular monomers being polymerized with one another and is within the capability of persons of ordinary skill in the relevant art. Examples of photoinitiators include benzophenone, acetophenone, benzoin ether, benzyl dialkyl ketones, and derivatives thereof. Examples of suitable thermal initiators are inorganic peroxo compounds, such as peroxodisulfates (ammonium and sodium peroxodisulfate), peroxosulfates, percarbonates and hydrogen peroxide; organic peroxo compounds, such as diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl peracetate, tert-butyl permaleate, tert-butyl perisobutyrate, tert-butylperpivalate, tert-butyl peroctoate, tert-butyl pemeodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds, such as 2,2'-azobisisobutyronitrile, 2,2'-azobis(2-methylbutyronitrile), 2,2'-azobis (2-methylpropionamidine)dihydrochloride, and azobis(2-amidopropane) dihydrochloride.

In some embodiments, thermal initiators can optionally be used in combination with reducing compounds. Examples of such reducing compounds are phosphorus-containing compounds, such as phosphorus acid, hypophosphites and phosphinates; sulfur-containing compounds, such as sodium hydrogen sulfite, sodium sulfite, sodium metabisulfite, and sodium formaldehyde sulfoxylate; and hydrazine. It is considered that these reducing compounds, in some cases, also function as chain regulators.

Another category of suitable initiators is the group of persulfates, including, for example, sodium persulfate. In some embodiments one or more persulfate is used in the presence of one or more reducing agents, including, for example, metal ions (such as, for example, ferrous ion), sulfur-containing ions (such as, for example, S2O3(=), HSO3(−), SO3(=), S2O5(=), and mixtures thereof), and mixtures thereof.

When initiator is used, the amount of all initiator used, as a weight percentage based on the total weight of all monomers used, is 0.01% or more; or 0.03% or more; or 0.1% or more; or 0.3% or more. Independently, when initiator is used, the ratio of the weight of all initiator used to the total weight of all monomers used is 10% or less, such as 5% or less; or 3% or less; or even 1% or less.

When initiator is used, it may be added in any fashion, at any time during the process. For example, some or all of the initiator may be added to the reaction vessel at the same time that one or more of the monomers is being added to the reaction vessel. In some embodiments, the initiator is added with a constant rate of addition. In other embodiments, the initiator is added with an increasing rate of addition, for example in two or more steps, where each step uses a higher rate of addition than the previous step. In some embodiments, the rate of addition of initiator increases and then decreases.

Production of the polymer having chelating functionality in accordance with the present invention may also involve the use of a chain regulator. A chain regulator is a compound that acts to limit the length of a growing polymer chain. Some suitable chain regulators are, for example, sulfur compounds, such as mercaptoethanol, 2-ethylhexyl thioglycolate, thioglycolic acid, and dodecyl mercaptan. Other suitable chain regulators are the reducing compounds mentioned herein above. In some embodiments, the chain regulator includes sodium metabisulfite. In some embodiments, the amount of chain regulator, as a percentage by weight based on the total weight of all monomers used, is 0.5% or more; or 1% or more; or 2% or more; or 4% or more. Independently, in some embodiments, the amount of chain regulator, as a percentage by weight based on the total weight of all monomers used, is 25% or less, such as 18% or less; 12% or less; 8% or less; or even 6% or less. In some embodiments, amounts of initiator larger that the amount needed to initiate polymerization can act as chain regulator.

Other suitable chain regulators include, for example without limitation, OH-containing compounds which are suitable for use in a mixture with water to form a solvent (such as isopropanol and propylene glycol). It is contemplated that, in some embodiments, the chain regulator is a component of the solvent and thus the chain regulator may be present in amounts larger than 25% by weight based on the total weight of all monomers used.

Chain regulator may be added to the reaction vessel in any fashion. In some embodiments, the chain regulator is added to the reaction vessel at a constant rate of addition. In some embodiments, the chain regulator is added to the reaction vessel at a rate of addition that increases or decreases or a combination thereof.

For each ingredient that is added to the reaction vessel, that ingredient may be added in pure form. Alternatively, an ingredient that is added to the reaction vessel may be added in the form of a solution in a solvent, in the form of a mixture with one or more other ingredient, or as a combination thereof (i.e., as a mixture with one or more other ingredient, where that mixture is dissolved in a solvent). The form in which any one ingredient is added to the reaction vessel may be chosen independently of the form in which any other ingredient is added to the reaction vessel.

Additionally, in some embodiments, the polymer having chelating functionality in accordance with the present invention may be produced by aqueous emulsion polymerization techniques. Generally, aqueous emulsion polymerization involves monomer, initiator, and surfactant in the presence of water. The emulsion polymerization may be performed by a method that includes the steps of adding one or more monomers (which may be neat, in solution, in aqueous emulsion, or a combination thereof) to a vessel that contains, optionally with other ingredients, water.

In accordance with the present invention, the one or more monomers used in the emulsion polymerization comprise at least one ethylenically unsaturated aminocarboxylate monomer, as described hereinabove. Additional monomers, selected from ethylenically unsaturated monomers, may also be included.

Initiators suitable for use in emulsion polymerization processes include, for example, water soluble peroxides, such as sodium or ammonium persulfate; oxidants, such as persulfates or hydrogen peroxide, in the presence of reducing agents, such as sodium bisulfite or isoascorbic acid and/or polyvalent metal ions, to form an oxidation/reduction pair to generate free radicals at any of a wide variety of temperatures; water soluble azo initiators, including cationic azo initiators, such as 2,2'-azobis(2-methylpropionamide)dihydrochloride. Furhermore, the emulsion polymerization process may employ one or more oil-soluble initiators, including, for example, oil-soluble azo initiators.

One or more surfactants may be employed. For example, at least one of the surfactants may be selected from alkyl sulfates, alkylaryl sulfates, alkyl or aryl polyoxyethylene nonionic surfactants, and mixtures thereof.

The use, application and benefits of the present invention will be clarified by the following discussion and description of exemplary embodiments and applications of the compositions formulations present invention.

EXAMPLES

Example 1

Synthesis of ED2A, ED3A 2 g ethylene diamine were added to 30 ml DI H$_2$O, followed by addition of 8 g of 50% aqueous NaOH. The ethylene diamine-NaOH solution was raised to 50° C. 9.45 g chloroacetic acid were added to the heated solution over a period of 1 hour. After addition of all the chloroacetic acid, the temperature was raised to 70° C. for 5 hours and the pH was maintained at 9-10 by addition of 50% NaOH throughout the reaction. The resulting product contained the following compounds in the proportions noted: ethylenediamine di-acetic acid (3.1%), ethylenediamine tri-acetic acid (36.1%), and ethylenediamine tetra-acetic acid (60.3%).

Example 2

Synthesis of ED3A-GMA Monomer

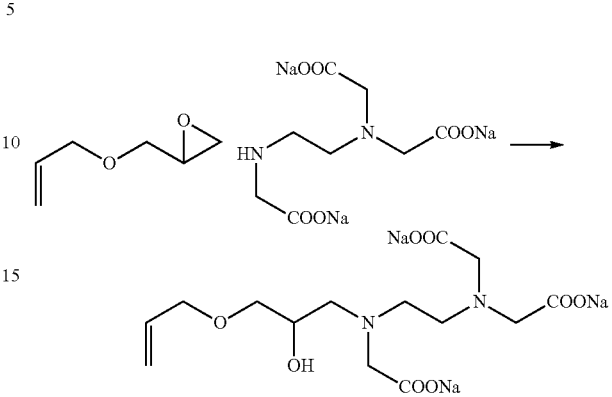

To a 1 L round bottom flask equipped with a magnetic stirbar and an addition funnel, 175 grams of ED3A solution (28.6% active) was charged. The solution was placed in a water bath, and set to stir at a minimum of 300 rpm. 0.4 g of a phase transfer catalyst (benzyltrimethylammonium chloride) was charged to the vessel and allowed to dissolve completely over approximately five minutes. During this time, 18.85 g of allyl glycidyl ether (AGE) was charged to the addition funnel. The AGE was added drop wise to the stirring reaction mass, and when complete, allowed to stir at room temperature until the reaction mass transitioned from two phases to a single phase. This was determined by visual observation, in which prior to completion, the reaction mass was hazy, and would separate into two distinct phases upon termination of stirring. Upon completion, the reaction mass was observed to be a transparent yellow solution, which was stable upon termination of stirring. At this stage the product is a yellow solution of pH 13 and active level of 33.5 wt. % ED3A-AGE. This solution is stable to storage under ambient conditions and can be used as such.

To convert the ED3A-AGE monomer into solid form, sulfuric acid was added drop wise while stirring in order to adjust the pH of the solution, halting the flow of sulfuric acid when the pH was between 7-7.5.

Example 3

Synthesis of Poly-(AA/ED3A-AGE)

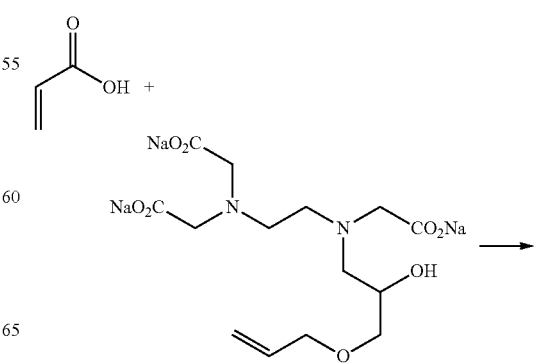

-continued

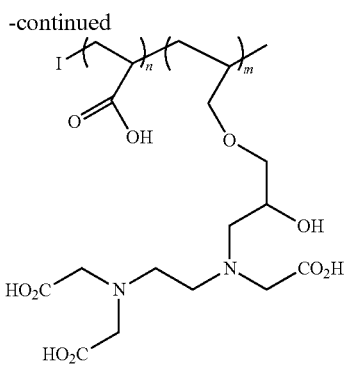

To a one liter round bottom flask, equipped with a mechanical stirrer, heating mantle, thermocouple, condenser and inlets for the addition of monomer, initiator and chain regulator is charged 100 grams of aqueous solution containing ED3A-AGE (30% actives). Sulfuric acid is added dropwise to the flask to adjust the pH of the solution to 3.5 or below. The solution is set to stir and heated to 78° C. (+/−2° C.). In the meantime, a monomer solution of 45 grams of glacial acrylic acid is added to a graduated cylinder for addition to the flask. An initiator solution of 1.67 grams of sodium persulfate is dissolved in 15 grams of deionized water and added to a syringe for addition to the kettle. A chain regulator solution of 13.39 grams of sodium metabisulfite dissolved in 22.5 grams of deionized water is added to a syringe for addition to the kettle. A promoter solution of 7.75 grams of a 0.15% iron sulfate heptahydrate solution is added to a vial and set aside.

Once the kettle contents reach reaction temperature of 78° C., the promoter solution is added. After the reaction temperature recovered to 78° C., the feeds for the monomer, initiator and CTA solutions are each begun. The monomer feed is added over 90 minutes, CTA cofeed added over 80 minutes and initiator cofeed added over 95 minutes, all at 78° C.

At the completion of the feeds, 5 grams of deionized water is added to the monomer feed vessel, as rinse. The reaction is held for 15 minutes at 78° C. In the meantime, the chaser solutions of 0.29 grams of sodium metabisulfite and 6.6 grams of deionized water is mixed and set aside, and 0.29 grams of sodium persulfate and 5 grams of deionized water is mixed and set aside.

At the completion of the hold, the above solutions are added linearly over 10 minutes and held for 20 minutes at 78° C. The chaser solution preparations are repeated and added to the kettle over 10 minutes, followed by a final 20 minute hold.

At the completion of the final hold, cooling is begun with the addition of 47.50 grams of deionized water. At 50° C. or below, a solution of 46.3 grams of 50% sodium hydroxide is added to an addition funnel and slowly added to the kettle, controlling the exotherm to keep the temperature below 65° C. Finally, 1.4 grams of a scavenger solution of 35% hydrogen peroxide is added to the kettle.

Example 4

Synthesis of Poly-(Acrylic Acid/ED3A-AGE)

To a three liter round bottom flask, equipped with a mechanical stirrer, heating mantle, thermocouple, condenser and inlets for the addition of monomer, initiator and chain regulator were charged 57 g of ED3A-AGE crude solution (37.5% active) and 60.6 g of deionized water. The solution was stirred and 10.9 g of sulfuric acid was slowly added until the pH of the solution was below 3.0. The stirring solution was heated to 92° C. (+/−2° C.). In the meantime, a monomer solution of 203.63 g of glacial acrylic acid was added to a graduated cylinder for addition to the flask. An initiator solution of 5.01 g of sodium persulfate was dissolved in 45 g of deionized water and added to a syringe for addition to the kettle. A chain regulator solution of 20.86 g of sodium hypophosphite dissolved in 67.5 g of deionized water was added to a syringe for addition to the kettle. A promoter solution of 0.75 g of a 0.15% iron sulfate heptahydrate solution was added to a vial and set aside.

Once the kettle contents reached reaction temperature of 92° C., the promoter solution was added. After the reaction temperature recovered to 92° C., the monomer, initiator and CTA solutions were begun. The monomer feed was added over 90 minutes, CTA cofeed added over 80 minutes and initiator cofeed added over 95 minutes at 92° C.

At the completion of the feeds, 5 g of deionized water was added to the monomer feed vessel, as rinse. The reaction was held for 15 minutes at 92° C. In the meantime, the two chaser solutions of 0.87 g of sodium persulfate and 15 g of deionized water each were mixed and set aside.

At the completion of the hold, the above solutions were added linearly over 10 minutes and held for 20 minutes at 92° C. The chaser solution preparations were repeated and added to the kettle over 10 minutes, followed by a 20 minute hold.

At the completion of the final hold, cooling was begun with the addition of deionized water. At 50° C. or below a solution of 219.9 g of 50% sodium hydroxide was added to an addition funnel and slowly added to the kettle, controlling the exotherm to keep the temperature below 65° C.

The reaction was then cooled and packaged.

The final polymer had a solids content of 38.24% (as measured in a forced draft oven at 150° C. for 60 minutes). pH of the solution was 7.7 and final molecular weight as measured by Gel Permeation Chromatography was 8,341 Daltons.

Example 5

Synthesis of Poly-(Acrylic Acid/ED3A-AGE)

To a three liter round bottom flask, equipped with a mechanical stirrer, heating mantle, thermocouple, condenser and inlets for the addition of monomer, initiator and chain regulator were charged 30 g of ED3A-AGE crude solution (37.5% active) and 60.6 g of deionized water. The solution was stirred and 10.9 g of sulfuric acid was slowly added until the pH of the solution was below 3.0. The stirring solution was heated to 92° C. (+/−2° C.). In the meantime, a monomer solution of 213.75 g of glacial acrylic acid was added to a graduated cylinder for addition to the flask. An initiator solution of 5.01 g of sodium persulfate was dissolved in 45 g of deionized water and added to a syringe for addition to the kettle. A chain regulator solution of 20.86 g of sodium hypophosphite dissolved in 16.69 g of deionized water was added to a syringe for addition to the kettle. A promoter solution of 0.75 g of a 0.15% iron sulfate heptahydrate solution was added to a vial and set aside.

Once the kettle contents reached reaction temperature of 92° C., the promoter solution was added. After the reaction temperature recovered to 92° C., the monomer, initiator and CTA solutions were begun. The monomer feed was added over 90 minutes, CTA cofeed added over 80 minutes and initiator cofeed added over 95 minutes at 92° C.

At the completion of the feeds, 5 g of deionized water was added to the monomer feed vessel, as rinse. The reaction was held for 15 minutes at 92° C. In the meantime, the two chaser solutions of 0.87 g of sodium persulfate and 15 g of deionized water each were mixed and set aside.

At the completion of the hold, the above solutions were added linearly over 10 minutes and held for 20 minutes at 92° C. The chaser solution preparations were repeated and added to the kettle over 10 minutes, followed by a 20 minute hold.

At the completion of the final hold, cooling was begun with the addition of deionized water. At 50° C. or below a solution of 223.1 g of 50% sodium hydroxide was added to an addition funnel and slowly added to the kettle, controlling the exotherm to keep the temperature below 65° C.

The reaction was then cooled and packaged.

The final polymer had a solids content of 38.99% (as measured in a forced draft oven at 150° C. for 60 minutes). pH of the solution was 7.37 and final molecular weight as measured by Gel Permeation Chromatography was 5,543 Daltons.

Example 6

Synthesis of Poly-(Acrylic Acid/Maleic acid/ED3A-AGE)

To a three liter round bottom flask, equipped with a mechanical stirrer, heating mantle, thermocouple, condenser and inlets for the addition of monomer, initiator and chain regulator were charged 39.86 g of ED3A-AGE crude solution (37.5% active), 17.75 g of maleic anhydride, and 100 mL of deionized water. The solution was stirred and 3.1 g of sulfuric acid was slowly added until the pH of the solution was below 3.0. The stirring solution was heated to 78° C. (+/−2° C.). In the meantime, a monomer solution of 270 g of glacial acrylic acid was added to a graduated cylinder for addition to the flask. An initiator solution of 6.66 g of sodium persulfate was dissolved in 20 g of deionized water and added to a syringe for addition to the kettle. A chain regulator solution of 54.05 g of sodium metabisulfite dissolved in 120 g of deionized water was added to a syringe for addition to the kettle. A promoter solution of 1 g of a 0.15% iron sulfate heptahydrate solution was added to a vial and set aside.

Once the kettle contents reached reaction temperature of 78° C., the promoter solution was added. After the reaction temperature recovered to 78° C., the monomer, initiator and CTA solutions were begun. The monomer feed was added over 105 minutes, CTA cofeed added over 90 minutes and initiator cofeed added over 110 minutes at 78° C.

At the completion of the feeds, 5 g of deionized water was added to the monomer feed vessel, as rinse. The reaction was held for 15 minutes at 78° C. In the meantime, the two chaser solutions of 0.57 g of sodium metabisulfite and 20 g of deionized water was mixed and set aside, and an additional feed of 0.29 g of sodium persulfate and 20 g of deionized water was mixed and set aside.

At the completion of the hold, the above solutions were added linearly over 10 minutes and held for 20 minutes at 78° C. The chaser solution preparations were repeated and added to the kettle over 10 minutes, followed by a 20 minute hold.

At the completion of the final hold, cooling was begun with the addition of deionized water. At 50° C. or below a solution of 46.3 g of 50% sodium hydroxide was added to an addition funnel and slowly added to the kettle, controlling the exotherm to keep the temperature below 65° C. Finally, 8.4 g of a scavenger solution of 35% hydrogen peroxide was added to the kettle.

The reaction was then cooled and packaged.

The final polymer had a solids content of 44.52% (as measured in a forced draft oven at 150° C. for 60 minutes). pH of the solution was 7.02 and final molecular weight as measured by Gel Permeation Chromatography was 8,698 Daltons.

Example 7

Synthesis of Poly-(Acrylic Acid/AMPS/ED3A-AGE)

To a three liter round bottom flask, equipped with a mechanical stirrer, heating mantle, thermocouple, condenser and inlets for the addition of monomer, initiator and chain regulator were charged 54 g of ED3A-AGE crude solution (37.5% active) and 127.5 g of deionized water. The solution was stirred and 10.6 g of sulfuric acid was slowly added until the pH of the solution was below 3.0. The stirring solution was heated to 78° C. (+/−2° C.). In the meantime, a monomer solution of 148.5 g of glacial acrylic acid and 112.5 g of 2-Acrylamido-2-methylpropane sulfonic acid (AMPS) were added to a graduated cylinder for addition to the flask. An initiator solution of 5.01 g of sodium persulfate was dissolved in 45 g of deionized water and added to a syringe for addition to the kettle. A chain regulator solution of 28.35 g of sodium metabisulfite dissolved in 93 g of deionized water was added to a syringe for addition to the kettle. A promoter solution of 0.75 g of a 0.15% iron sulfate heptahydrate solution was added to a vial and set aside.

Once the kettle contents reached reaction temperature of 78° C., the promoter solution was added. After the reaction temperature recovered to 78° C., the monomer, initiator and CTA solutions were begun. The monomer feed was added over 80 minutes, CTA cofeed added over 80 minutes and initiator cofeed added over 95 minutes at 78° C.

At the completion of the feeds, 5 g of deionized water was added to the monomer feed vessel, as rinse. The reaction was held for 15 minutes at 78° C. In the meantime, two chaser solutions of 0.87 g of sodium metabisulfite and 25 g of deionized water was mixed and set aside.

At the completion of the hold, the above solutions were added linearly over 10 minutes and held for 20 minutes at 78° C. The chaser solution preparations were repeated and added to the kettle over 10 minutes, followed by a 20 minute hold.

At the completion of the final hold, cooling was begun with the addition of deionized water. At 50° C. or below a solution of 5.2 g of 50% sodium hydroxide was added to an addition funnel and slowly added to the kettle, controlling the exotherm to keep the temperature below 65° C. Finally, 5.2 g of a scavenger solution of 35% hydrogen peroxide was added to the kettle.

The reaction was then cooled and packaged.

The final polymer had a solids content of 37.08% (as measured in a forced draft oven at 150° C. for 60 minutes). pH of the solution was 3.0 and final molecular weight as measured by Gel Permeation Chromatography was 7,851 Daltons.

We claim:
1. A polymer having chelating functionality consisting essentially of units derived from
   (a) an ethylenically unsaturated aminocarboxylate monomer having the following general structure:

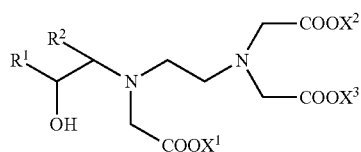

wherein $X^1$, $X^2$ and $X^3$ are each, independently, hydrogen or a mono- or polyvalent cation and the total charge on the monomer is zero; and one, and only one, of $R^1$ and $R^2$ is an —OH group, and the other is a polymerizable arm comprising a vinyl group and derived from one or more ethylenically unsaturated monomers, wherein the polymerizable arm has one of the following structures:

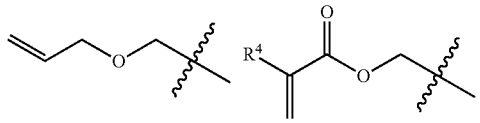

wherein $R^4$ is hydrogen or —$CH_3$.

2. The polymer according to claim 1, wherein the mono- or polyvalent cation may be selected from the group consisting of: $Na^+$, $K^+$, $NH_4^+$, organic ammonium ions, $Ca^{2+}$ and $Mg^{2+}$.

3. The polymer according to claim 1, wherein the polymerizable arm is derived from an ethylenically unsaturated monomer comprising an allyl glycidyl ether and has the following structure:

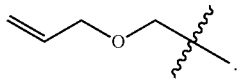 [SMILES: *COCC=C]

4. The polymer according to claim 1, wherein the polymerizable arm is derived from an ethylenically unsaturated monomer comprising glycidyl (meth)acrylate monomer and has the following structure:

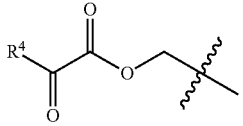

wherein $R^4$ is hydrogen or —$CH_3$.

5. The polymer according to claim 1, further comprising units derived from:

(b) one or more ethylenically unsaturated monomers.

6. The polymer according to claim 5, wherein the one or more ethylenically unsaturated monomers selected from the group consisting of carboxylic acids, esters of carboxylic acids, carboxylic acid anhydrides, imides, amides, styrenes, sulfonic acids, and combinations thereof.

7. The polymer according to claim 5, comprising (a) 0.5-99.5%, by weight, of the ethylenically unsaturated aminocarboxylate monomer, and (b) 99.5-0.5%, by weight, of the one or more ethylenicaly unsaturated monomers, based on the total weight of the polymer.

8. The polymer of claim 1 wherein the ethylenically unsaturated aminocarboxylate monomer has the following structure:

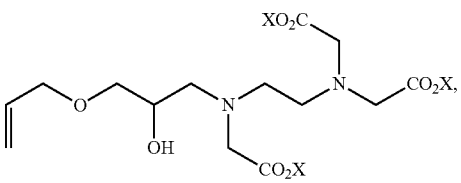

wherein each X is, independently, at least one cation selected from the group consisting of: $Na^+$, $K^+$, $NH_4^+$, organic ammonium ions, $Ca^{2+}$ and $Mg^{2+}$.

9. The polymer of claim 1 wherein the ethylenically unsaturated aminocarboxylate monomer has the following structure:

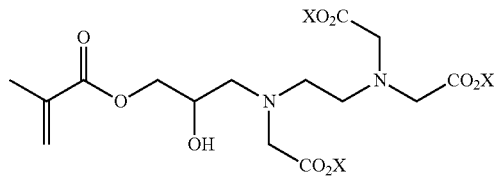

wherein each X is, independently, at least one cation selected from the group consisting of: $Na^+$, $K^+$, $NH_4^+$, organic ammonium ions, $Ca^{2+}$ and $Mg^{2+}$.

* * * * *